Dec. 20, 1960     J. E. HAWKINS     2,965,837
METHOD AND APPARATUS FOR ELECTRICAL WELL LOGGING
Filed Nov. 14, 1956     3 Sheets-Sheet 1

INVENTOR
JAMES E. HAWKINS
BY
Mason, Kolehmainen, Rathburn and Wyss
ATTORNEYS

Dec. 20, 1960 J. E. HAWKINS 2,965,837
METHOD AND APPARATUS FOR ELECTRICAL WELL LOGGING
Filed Nov. 14, 1956 3 Sheets-Sheet 2

INVENTOR
JAMES E. HAWKINS
BY
ATTORNEYS

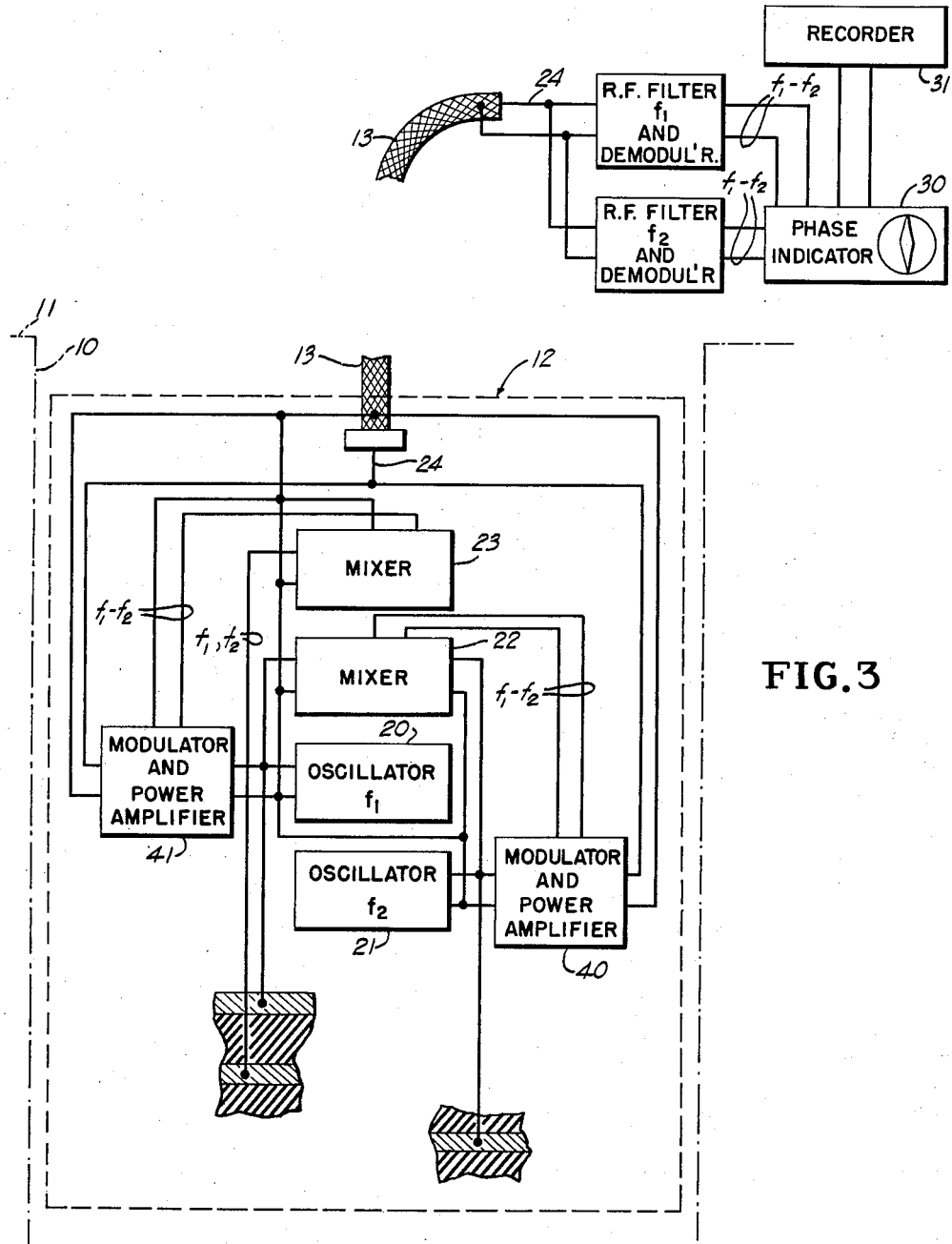

United States Patent Office 2,965,837
Patented Dec. 20, 1960

2,965,837

METHOD AND APPARATUS FOR ELECTRICAL WELL LOGGING

James E. Hawkins, Broken Arrow, Okla., assignor to Seismograph Service Corporation, Tulsa, Okla., a corporation of Delaware Filed Nov. 14, 1956, Ser. No. 622,039

13 Claims. (Cl. 324—1)

The present invention relates generally to a method and apparatus for electrical well logging and more particularly to a method and apparatus in which phase changes in signals passing through the borehole formations induced by variations in the electrical properties of these formations are measured in order to provide parameters from which the nature of the subsurface structure can be determined.

The electrical properties of the formations adjacent a borehole such as the magnetic susceptibility, the dielectric constant, and the electrical resistivity vary with the different strata found in the subterranean structure. Variations in these electrical properties cause phase shifts in electrical signals passing through the formations which phase shifts, in accordance with the present invention, may be measured to indicate the location and nature of the various subsurface strata encountered as the measuring apparatus traverses the borehole. It is, therefore, a primary object of the present invention to provide a novel method and apparatus for measuring the effect of the changing electrical properties of the borehole formations upon the phase of signals passed through the formations.

Another object of the present invention is to provide a new and improved method and apparatus for electrical well logging which utilizes the phase shift upon emanated signals caused by variations in the subsurface structure to provide parameters from which the subsurface strata may be located and identified.

A further object of the present invention is the provision of a new and improved electrical well logging apparatus which is characterized by simplicity of construction with the attendant advantages with respect to economy of installation and maintenance.

The invention both as to its organization and method of operation together with further objects and advantages thereof will best be understood by reference to the specification taken in conjunction with the accompanying drawings in which:

Fig. 3 is a partially diagrammatic, partially schematic illustration of another embodiment of the well logging system of the present invention.

Figure 1:
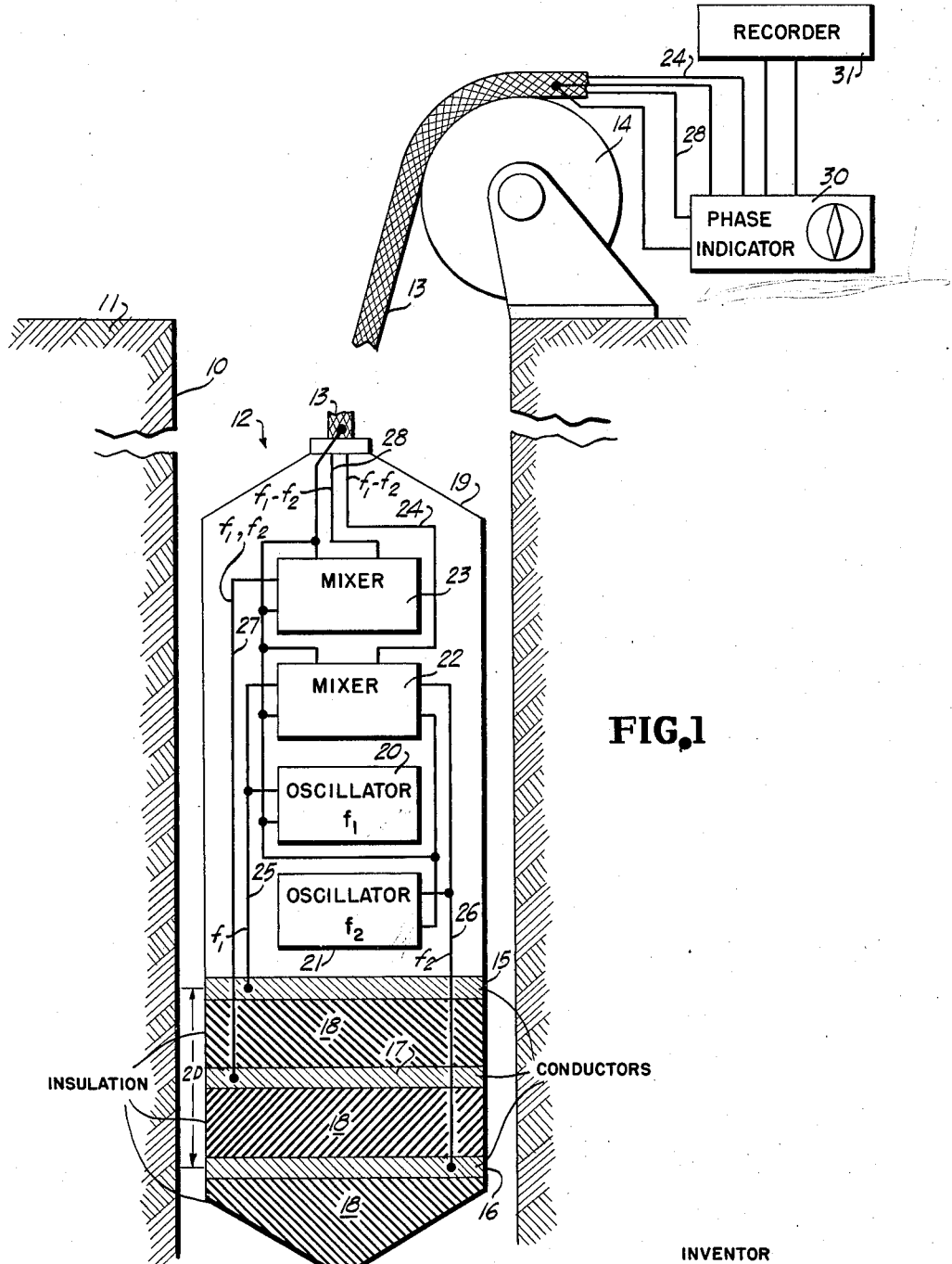
Fig. 1 is a partially diagrammatic, partially schematic illustration of a well logging system characterized by the features of the present invention.

Referring now to the drawings and more particularly to Fig. 1 thereof, the present invention is there illustrated as used in logging a borehole 10 which extends from the earth's surface through the subterranean formations 11 to be logged. As is usual in this art, the borehole 10 may be filled with drilling fluid. To log the formations 11, downhole equipment, generally indicated at 12, is attached to the lower end of a cable 13 extending through the borehole and trained over a motor driven sheave 14 at the earth's surface. The cable 13 includes one or more conductors encased within an electrically grounded, metallic outer sheath or shield with the cable illustrated in Figs. 1 and 2 having two inner conductors. The sheave 14 may be rotated in order to raise and lower the cable and, hence, to move the downhole equipment 12 through the borehole.

The downhole equipment, as is conventional in the art, may be enclosed within a housing 19 usually referred to as a bomb which is effectively sealed to prevent the entry of borehole fluid to the component elements enclosed therein. The outer surface of the bomb 19 is provided with a pair of longitudinally spaced apart current electrodes or supply coils 15 and 16 together with a pickup coil or electrode 17 spaced equidistantly from the electrodes 15 and 16. The three electrodes 15, 16 and 17 have their outer surfaces flush with the exterior of the housing 19 and, if desired, these electrodes may be urged into engagement with the walls of the borehole 10 by suitable biasing means, although this is not at all necessary in the practice of the present invention. The electrodes 15, 16 and 17 are electrically isolated by insulation 18 formed on the outer surface of the housing 19.

In the interior of the housing there is provided a pair of oscillators or signal generators 20 and 21 for respectively developing signals having relatively high frequencies of $f_1$ and $f_2$ which differ from each other by a small audio frequency in the order of five hundred cycles, for example. The oscillators 20 and 21 are preferably crystal controlled so that they are relatively stable. In addition, the housing 19 encloses a pair of non-linear mixer or heterodyning circuits 22 and 23. The output signals developed by both of the oscillators 20 and 21 are applied to the mixer circuit 22 which heterodynes these signals and produces a beat or difference frequency signal of $(f_1-f_2)$. The phase of this signal is independent of the electrical properties of the formations existing adjacent the borehole 10 and, hence, the signal may be referred to as a reference signal. The output of the mixer 22, which appears between conductor 24 and the grounded outer sheath of the cable 13, is passed through the cable to a phase indicator 30 at the earth's surface. This phase indicator is preferably of the type disclosed and claimed in the United States Patent No. 2,551,211 of James E. Hawkins and Beverly W. Koeppel, assigned to the same assignee as the present invention.

The output signal developed by the oscillator 20 is passed via conductor 25 to the current electrode 15 for passage through the borehole formations and through the conducting borehole fluid to the grounded outer sheath of the cable 13 from which it is returned to the low side of the oscillator 20. Similarly, the signals developed by the oscillator 21 are passed through a conductor 26 to the current electrode 16 for passage through the borehole formations to the grounded outer sheath of the cable 13 and back to the low side of the oscillator. The pickup electrode or coil 17 is thus excited by signals of frequency $f_1$ and frequency $f_2$ and both of these signals are passed through a conductor 27 to the mixer 23 where they are heterodyned to develop the beat or difference frequency signal of $(f_1-f_2)$. The latter signal is passed through a conductor 28 in the cable 13 to a second set of signal input terminals of the phase indicator 30 at the surface. The latter phase indicator measures the phase relationship between the two low frequency signals applied to its opposed sets of signal input terminals and provides an indication from which the nature of the subsurface structures may be determined. Specifically, as previously indicated, the phase of the reference signal appearing between conductor 24 and the outer sheath of the cable 13 is independent of variations in the subsurface structure but the phase of both of the signals picked up by the electrode 17 changes with variations in the electrical properties of the borehole formations. Among the properties which affect the phase of the signals picked up by the electrode 17 are the magnetic susceptibility, the dielectric constant, and the electrical resistivity. Variations in each of these factors introduces a phase shift which appears in the difference frequency developed at the output of the mixer 23 and impressed between the conductor 28 and the sheath of the cable 13. By employing the heterodyne principle in the manner indicated above, variations in the phase of the signals developed by the oscillators 20 and 21 do not affect the reading appearing upon the indicator 30 and thus the latter reading varies exclusively as a function of the changing properties of the subsurface formations. The signals which induce rotation of the indicating element of the phase indicator 30 may be recorded by suitable recording apparatus 31. The latter apparatus includes a recording medium driven in synchronism with the sheave 14 so that the signals may be recorded in time positions corresponding to the depth of the downhole equipment 12 with the result that a log or continuous curve indicative of the characteristics of the subsurface formations is produced.

The frequencies of the oscillators 20 and 21 may be changed and a second log of the borehole formations made in order to obtain indications useful in separating the electrical properties inducing the phase variations due to the fact that each of these properties responds differently to a change in frequency of the applied signals. A number of logs may thus be made each employing a different frequency in order to obtain a set of curves which may be compared to indicate and separate the various electrical properties causing the phase shifts. The particular frequencies selected for the different runs will, of course, depend upon the type of formations encountered, but experience will indicate which frequencies are likely to provide the best results in any particular area.

The power for energizing the oscillators 20 and 21 and the mixer circuits 22 and 23 may be provided by batteries in the downhole equipment 12 or, alternatively, this power may be derived by supplying an alternating current voltage from the surface over one of the conductors 24 or 28. In the latter case, the frequency of the power supply voltage will be different from the frequency of the difference frequency signals produced by the mixers 22 and 23 so that the power voltage can be separated by suitable filters in the subsurface equipment and employed to energize a D.C. power supply in conventional manner. Moreover, since the temperature and pressure vary considerably in the borehole, it is desirable to provide for stabilization of the electrical circuits enclosed within the housing 19. To this end, temperature and pressure insulating ovens can be employed enclosing the electrical circuits.

While the cable 13 has been described as a two-conductor cable, it will also be recognized that one of these conductors can be eliminated by modulating the signals developed by the mixers 22 and 23 upon the relatively high frequency signals developed by the oscillators 20 and 21. Thus, both of the resulting modulated signals may be passed over a single conductor to the earth's surface where the signals may be detected to separate and reproduce the two modulation components and pass the same to the sets of signal input terminals of the phase indicator 30.

A system of this type is illustrated in Fig. 3 wherein the output signal of the mixer 22 is supplied to an amplitude modulator and power amplifier 40 where it is amplitude modulated upon the relatively high frequency signal developed by the oscillator 21. Similarly, a modulator and power amplifier 41 functions to amplitude modulate the signal developed by mixer 23 upon the higher frequency signal produced by oscillator 20. The output signals from both of the modulator and power amplifier circuits 40 and 41 are impressed between cable conductor 24 and the outer sheath of cable 13. The two signals appearing on the cable 24 are separated in the surface equipment by a pair of high frequency band pass filters and demodulators 42 and 43 respectively tuned to frequencies of $f_1$ and $f_2$. After separation the detected modulation components are applied to the opposed sets of signal input terminals of the phase indicator 30 which measures the phase relationship between the two input signals in the manner described above.

As previously indicated, the elements 15, 16 and 17 may be either electrodes or coils and, in addition, these elements can be employed to obtain a measurement of acoustic velocity by supplying acoustic signals from the elements 15 and 16 and receiving these signals at the element 17. A measurement of the time difference between the propagation and reception of the acoustic signals is, of course, indicative of the velocity of propagation of each of the formations encountered as the downhole tool 12 is moved through the borehole, thus providing a second parameter indicative of the nature of the subsurface strata.

Figure 2:
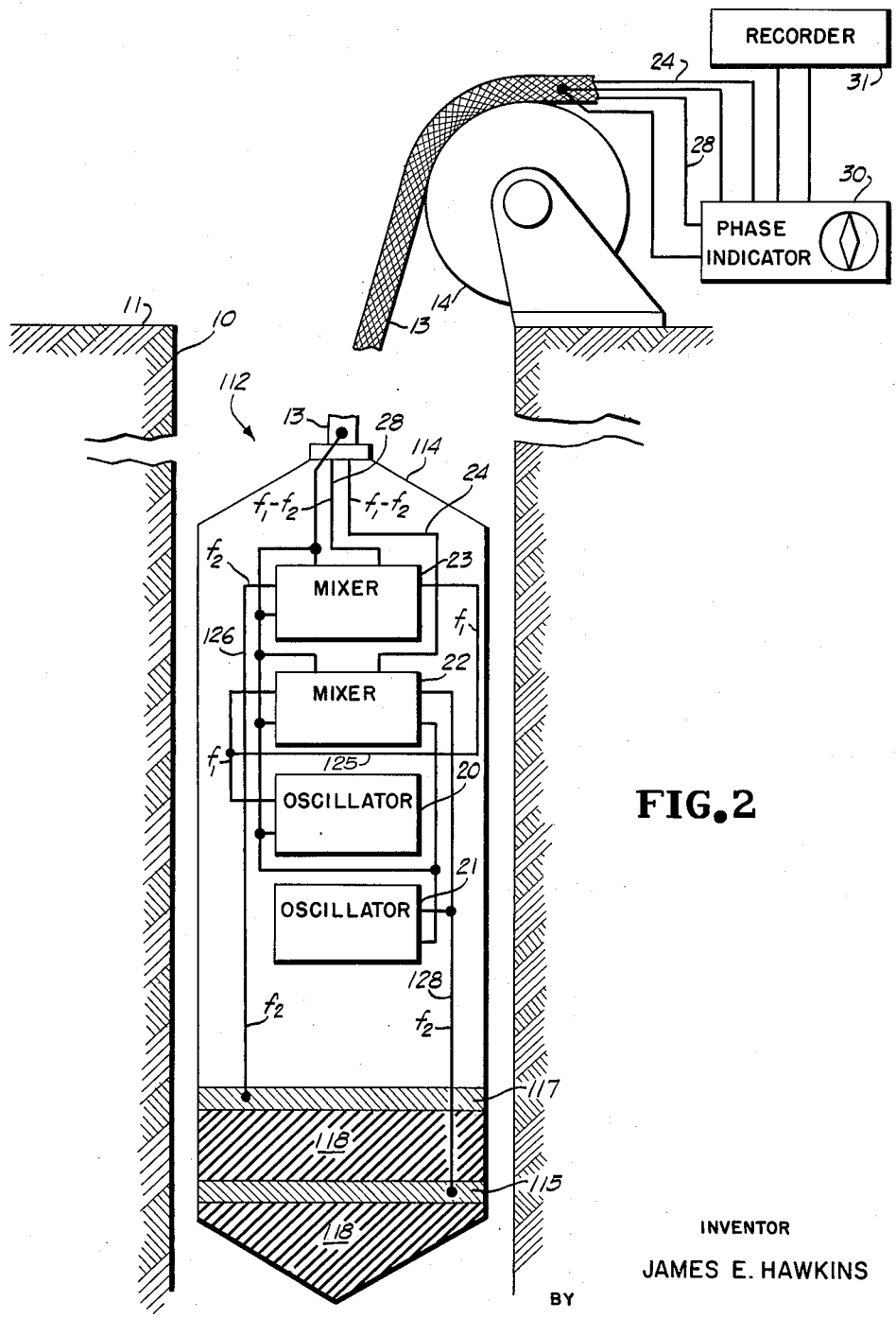
Fig. 2 is a partially diagrammatic, partially schematic illustration of an alternative arrangement of the well logging system of the present invention.

A second system characterized by the features of the present invention is illustrated in Fig. 2 wherein downhole equipment 112 is attached to the lower end of the cable 13 to be lowered into the borehole 10. The surface equipment used in the system illustrated in Fig. 2 is identical to that previously described and, hence, corresponding elements have been assigned the same reference numerals. The equipment 112 includes a casing or bomb 114 having a current electrode 115 and a pickup electrode or coil 117 spaced apart longitudinally of the casing on its outer surface. As before, the electrodes 115 and 117 are isolated electrically by means of insulation 118. The electrical components enclosed within the casing include a pair of oscillators 20 and 21 and a pair of non-linear mixers 22 and 23 which are respectively identical to the circuit components bearing corresponding reference numerals in the system illustrated in Fig. 1. The output of the oscillator 21 is supplied through a conductor 128 to the current electrode 115 with the result that signals are passed from the latter electrode through the borehole formations and through the borehole fluid to the grounded outer sheath of the cable 13.

The mixer 22, as described above, is excited by the output signals developed by both of the oscillators 20 and 21 with the result that this mixer functions to produce a heterodyne or beat frequency signal of $(f_1-f_2)$ which functions as a reference signal and is supplied through conductor 24 to the phase indicator 30 of the surface equipment. The output signals developed by the oscillator 20 are also passed via conductor 125 to the right-hand set of signal input terminals of the mixer 23.

All of the signals picked up or detected by the electrode or pickup coil 117 have a frequency of $f_2$ since the output signals developed by the oscillator $f_1$ do not flow through the borehole formations. The signals of frequency $f_2$ picked up by the electrode 117 are passed over a conductor 126 to the left-hand set of signal input terminals of the mixer 23. The two signals supplied to the opposite sets of signals input terminals of the mixer 23 are heterodyned to develop a difference frequency or beat signal of $(f_1-f_2)$ which is passed through conductor 28 to the phase indicator 30 of the surface equipment.

As previously indicated, the phase of the signal of frequency $f_1$ is not affected by the electrical properties of the borehole formations, but the phase of the signals of frequency $f_2$ supplied to the mixer 23 is varied by changes in these electrical properties with the result that the difference frequency signal developed by the mixer 23 reflects the phase variations. The phase indicator 30 functions to measure the phase relationship between the two signals supplied to its separate sets of signal input terminals and provides an indication which varies in accordance with the electrical properties of the formation inducing the phase shift in the signals of frequency $f_2$ detected by the pickup electrode 117. By heterodyning the signals in the manner described, the phase indications appearing on the indicator 30 do not reflect phase variations in the signals developed by either or both of the oscillators 20 and 21 and, hence, these indications vary almost exclusively as a function of the variations in the electrical properties of the formations adjacent the borehole 10.

As in the system described in Fig. 1, several logs may be obtained by making different runs with the equipment illustrated in Fig. 2 and by varying the frequency of the oscillators 20 and 21 for each of the runs in order effectively to separate the different electrical properties causing the phase shifts in the signal passing through the borehole formations. Moreover, as in the system illustrated in Fig. 1, the electrode or coil 115 may be employed to supply acoustic signals to the borehole formations for reception by the electrode or coil 117 so that the time difference between the propagation and reception of the acoustic signal may be measured to obtain an indication of the acoustic velocity of propagation of the formations. The acoustic velocity indication, of course, provides an additional parameter for locating and identifying the different strata encountered by the downhole equipment 112 as it traverses the borehole.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. An electrical well logging system for determining the characteristics of earth formations surrounding a borehole or the like, which system comprises a cable extending through the borehole, downhole equipment carried by said cable and adapted to be raised and lowered within the borehole, means for developing a first alternating current, means including at least one current supply element in the downhole equipment for continuously supplying said first alternating current to the earth formations as the downhole equipment traverses the borehole, pickup means located at fixed distance from said current supply element for receiving the first alternating current, means for developing a second alternating current simultaneously with the first alternating current, means for heterodyning the outputs of both of the means for developing the first and second alternating currents in order to produce a reference signal, means for heterodyning the first alternating current received by said pickup means with the second alternating current to develop a beat signal, and means for measuring the phase relationship between the reference signal and the beat signal in order to indicate the electrical properties of said formations.

2. An electrical well logging system for determining the characteristics of earth formations surrounding a borehole or the like, which system comprises a cable extending through the borehole, downhole equipment carried by said cable and adapted to be raised and lowered within the borehole, means in the downhole equipment including a signal generator and a current supply element for continuously supplying a first alternating current to the earth formations as the downhole equipment traverses the borehole, pickup means spaced longitudinally from the current supply element for receiving the first alternating current, means in the downhole equipment for developing a second alternating current, means in the downhole equipment for heterodyning the outputs of both of the means for developing the first and second alternating currents in order to produce a reference signal for passage to the surface through said cable, means in the downhole equipment for heterodyning the first alternating current received by the pickup means with the second alternating current to develop a beat signal for passage to the surface through said cable to the surface, and a phase comparison device at the surface connected to said cable for determining the phase relationship between the beat signal and the reference signal in order to indicate the electrical properties of said formations.

3. An electrical well logging system for determining the characteristics of earth formations surrounding a borehole or the like, which system comprises downhole equipment including a pair of signal generators for simultaneously supplying two alternating currents of different frequency to said formations, pickup means in said downhole equipment for receiving said currents, means for mixing the received currents to obtain a beat signal, means for mixing the outputs of said signal generators in order to obtain a reference signal, and means for comparing the phase of said beat signal and said reference signal as said downhole equipment is moved through the borehole.

4. An electrical well logging system for determining the characteristics of earth formations surrounding a borehole or the like, which system comprises a cable extending through the borehole, downhole equipment carried by said cable and adapted to be raised and lowered within the borehole, means including a pair of signal generators for supplying two alternating currents of different frequency simultaneously to said formations from supply elements spaced longitudinally apart in said downhole equipment, pickup means in said downhole equipment longitudinally spaced from the current supply elements for receiving said currents, means for mixing the received currents to obtain a beat signal, means for mixing the outputs of said signal generators in order to obtain a reference signal, and means for measuring the phase relationship between said beat signal and said reference signal as said downhole equipment is moved through the borehole.

5. An electrical well logging system for determining the characteristics of earth formations surrounding a borehole or the like, which system comprises a cable extending through the borehole, downhole equipment carried by said cable and adapted to be raised and lowered within the borehole, means including a pair of signal generators in the downhole equipment for supplying two alternating currents of different frequency to said formations simultaneously from supply elements spaced longitudinally apart in said downhole equipment, pickup means in said downhole equipment spaced longitudinally from the current supply elements for receiving said currents, means in the downhole equipment for mixing said currents to obtain a beat signal for passage through the cable to the surface, means in the downhole equipment for mixing the outputs of said signal generators in order to obtain a reference signal for passage through the cable to the surface, and means at the surface connected to said cable and responsive to phase variations between said beat signal and said reference signal as said downhole equipment is moved through the borehole for indicating the electrical properties of the borehole formations.

6. A method of electrical well logging to determine the characteristics of formations surrounding a borehole or the like which method comprises the steps of continuously supplying an alternating current of predetermined frequency to the borehole formations from at least one current supply point, receiving said current at a point spaced from the supply point, moving the current supply and receiving points in unison, generating a second alternating current, producing a reference signal by electrically mixing said second alternating current with the first alternating current before the latter is supplied to the borehole formations, producing a beat signal by electrically mixing said second alternating current with the received current, comparing the phase of the beat signal and the reference signal to indicate the electrical properties of the borehole formations, changing the frequency of the alternating current supplied to the borehole formations and repeating the receiving, moving and measuring steps.

7. A method of electrical well logging to determine the characteristics of formations surrounding a borehole or the like which method comprises the steps of continuously supplying an alternating current having a first predetermined frequency to the borehole formations from at least one current supply point, receiving said current at a point spaced longitudinally from the supply point, moving the current supply and receiving points in unison, generating a second alternating current, producing a reference signal by electrically mixing said second alternating current with the first alternating current before the latter is supplied to the borehole formations, producing a beat signal by electrically mixing said second alternating current with the received current, comparing the phase of the beat signal and the reference signal to indicate the electrical properties of the borehole formations, changing the frequency of the alternating current supplied to the borehole formations to a second predetermined frequency and repeating the receiving, moving and measuring steps while the current of second predetermined frequency is continuously supplied to the borehole formations.

8. The well logging system defined by claim 1 which additionally includes means for respectively modulating said beat signal and said reference signal upon said first and second alternating currents so that the resulting modulated signals may be passed through a single conductor in said cable, and means at the earth's surface for separating and demodulating the modulated signals and for passing the modulation components to the phase measuring means.

9. The well logging system defined by claim 3 which additionally includes means for respectively modulating said beat signal and said reference signal upon different ones of said two alternating currents so that the resulting modulated signals may be passed through a single conductor in said cable, and means at the earth's surface for separating and demodulating the modulated signals and for passing the modulation components to the phase measuring means.

10. The well logging system defined by claim 5 which additionally includes means for respectively modulating said beat signal and said reference signal upon different ones of said two alternating currents so that the resulting modulated signals may be passed through a single conductor in said cable, and means at the earth's surface for separating and demodulating the modulated signals and for passing the modulation components to the phase measuring means.

11. The system defined by claim 1 wherein means are provided for supplying the second alternating current to the earth formations so that the second alternating current is received by said pickup means and after reception is heterodyned with said first alternating current to develop said beat signal.

12. The system defined by claim 1 wherein said beat signal is developed by heterodyning the first alternating current received by the pickup means with the output of the means for developing said second alternating current.

13. The well logging system defined in claim 2 wherein the downhole equipment also includes means for respectively modulating said beat signal and said reference signal upon said first and second alternating currents so that the resulting modulated signals may be passed over a common conductor in said cable and wherein means are provided at the earth's surface for separating and demodulating the modulated signals on said common conductor and for passing the modulation components to the phase comparison device.

References Cited in the file of this patent

UNITED STATES PATENTS

| | | |
|---|---|---|
| 1,996,530 | Sundberg | Apr. 2, 1935 |
| 2,376,168 | Mounce | May 15, 1945 |
| 2,573,133 | Greer | Oct. 30, 1951 |
| 2,608,602 | Muffly | Aug. 26, 1952 |
| 2,652,530 | Davidson | Sept. 15, 1953 |
| 2,712,629 | Doll | July 5, 1955 |
| 2,716,730 | Williams | Aug. 30, 1955 |
| 2,723,375 | Schuster | Nov. 8, 1955 |
| 2,788,483 | Doll | Apr. 9, 1957 |